United States Patent
Chen et al.

(10) Patent No.: US 10,222,547 B2
(45) Date of Patent: Mar. 5, 2019

(54) FLAME-RETARDANT OPTICAL FIBER COATING

(71) Applicant: CORNING INCORPORATED, Corning, NY (US)

(72) Inventors: Yangbin Chen, Lima, NY (US); Emanuela Gallo, Berlin (DE); Manuela Ocampo, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/363,611

(22) Filed: Nov. 29, 2016

(65) Prior Publication Data

US 2017/0153389 A1 Jun. 1, 2017

Related U.S. Application Data

(60) Provisional application No. 62/294,051, filed on Feb. 11, 2016, provisional application No. 62/260,991, filed on Nov. 30, 2015.

(51) Int. Cl.
| | |
|---|---|
| *G02B 6/02* | (2006.01) |
| *G02B 1/14* | (2015.01) |
| *C03C 25/1065* | (2018.01) |
| *C03C 25/106* | (2018.01) |
| *C03C 13/04* | (2006.01) |

(Continued)

(52) U.S. Cl.
CPC .......... *G02B 6/02395* (2013.01); *C03C 13/04* (2013.01); *C03C 25/105* (2013.01); *C03C 25/1061* (2018.01); *C03C 25/1065* (2013.01); *C09D 4/00* (2013.01); *C09D 5/18* (2013.01); *C09K 21/02* (2013.01); *C09K 21/12* (2013.01); *G02B 1/045* (2013.01); *C03C 2217/228* (2013.01); *C03C 2217/70* (2013.01); *C08F 222/1006* (2013.01); *C08K 3/26* (2013.01); *C08K 3/38* (2013.01); *C08K 2003/2227* (2013.01); *C08K 2003/265* (2013.01); *C08K 2003/267* (2013.01); *C08K 2003/387* (2013.01); *C08K 2201/005* (2013.01); *C08K 2201/019* (2013.01)

(58) Field of Classification Search
None
See application file for complete search history.

(56) References Cited

U.S. PATENT DOCUMENTS

| | | | |
|---|---|---|---|
| 3,746,665 A | 7/1973 | Koleske et al. | |
| 4,002,580 A | 1/1977 | Russo | |

(Continued)

FOREIGN PATENT DOCUMENTS

| | | |
|---|---|---|
| CN | 1773450 A | 5/2006 |
| CN | 102585347 A | 7/2012 |

(Continued)

*Primary Examiner* — Michelle R Connelly

(57) ABSTRACT

A flame retardant optical fiber is provided. The flame retardant optical fiber includes a glass core, a cladding surrounding the glass core and a primary coating adhered to the cladding. The flame retardant optical fiber also includes a secondary coating surrounding the primary coating, wherein the secondary coating is formed from a coating composition that is substantially free of an oligomeric component and that comprises a flame retardant composition including a flame retardant material.

23 Claims, 3 Drawing Sheets

(51) Int. Cl.
*C03C 25/105* (2018.01)
*C09D 4/00* (2006.01)
*C09D 5/18* (2006.01)
*C09K 21/02* (2006.01)
*C09K 21/12* (2006.01)
*G02B 1/04* (2006.01)
*C08K 3/26* (2006.01)
*C08K 3/38* (2006.01)
*C08K 3/22* (2006.01)
*C08F 222/10* (2006.01)

(56) References Cited

U.S. PATENT DOCUMENTS

| | | |
|---|---|---|
| 4,076,380 A | 2/1978 | DiMarcello et al. |
| 4,176,911 A | 12/1979 | Marcatili et al. |
| 4,300,930 A | 11/1981 | Chang |
| 4,322,575 A | 3/1982 | Skipper |
| 4,402,570 A | 9/1983 | Chang |
| 4,439,008 A | 3/1984 | Joormann et al. |
| 4,486,212 A | 12/1984 | Berkey |
| 4,608,409 A | 8/1986 | Coady et al. |
| 4,609,718 A | 9/1986 | Bishop et al. |
| 5,173,960 A | 12/1992 | Dickinson |
| 5,204,928 A | 4/1993 | Konda et al. |
| 5,456,984 A | 10/1995 | Bishop et al. |
| 5,729,645 A | 3/1998 | Garito et al. |
| 5,837,750 A | 11/1998 | Szum et al. |
| 5,851,663 A | 12/1998 | Parsons et al. |
| 5,978,536 A | 11/1999 | Brandi et al. |
| 6,026,208 A | 2/2000 | Will et al. |
| 6,045,913 A | 4/2000 | Castle |
| 6,080,483 A | 6/2000 | Szum et al. |
| 6,236,791 B1 | 5/2001 | Lausch et al. |
| 6,252,173 B1 | 6/2001 | Brown et al. |
| 6,254,981 B1 | 7/2001 | Castle |
| 6,284,368 B2 | 9/2001 | Muta et al. |
| 6,316,516 B1 | 11/2001 | Chien et al. |
| 6,433,049 B1 | 8/2002 | Romenesko et al. |
| 6,453,104 B1 | 9/2002 | Shimada et al. |
| 6,472,450 B2 | 10/2002 | Szum et al. |
| 6,498,883 B1 | 12/2002 | Wilson |
| 6,556,757 B2 | 4/2003 | Ellison et al. |
| 6,584,256 B2 | 6/2003 | Shimada et al. |
| 6,775,451 B1 | 8/2004 | Botelho et al. |
| 6,846,852 B2 | 1/2005 | Allen et al. |
| 6,893,719 B1 | 5/2005 | Nakajima et al. |
| 6,958,418 B2 | 10/2005 | Meyer et al. |
| 7,144,941 B2 | 12/2006 | Sauerwein et al. |
| 7,153,570 B2 | 12/2006 | Nakajima et al. |
| 7,155,100 B2 | 12/2006 | Murphy et al. |
| 7,221,841 B2 | 5/2007 | Chase et al. |
| 7,304,245 B2 | 12/2007 | Alexander et al. |
| 7,326,739 B2 | 2/2008 | Wilson et al. |
| 7,354,958 B2 | 4/2008 | Ohkoshi et al. |
| 7,378,463 B2 | 5/2008 | Abu-Isa |
| 7,403,687 B2 | 7/2008 | Smith |
| 7,459,498 B2 | 12/2008 | Globus et al. |
| 7,493,000 B2 | 2/2009 | Yamaguchi et al. |
| 7,542,644 B2 | 6/2009 | Tanaka et al. |
| 7,542,645 B1 | 6/2009 | Hua et al. |
| 7,577,330 B2 | 8/2009 | Beshears et al. |
| 7,660,504 B2 | 2/2010 | Beshears et al. |
| 7,660,505 B2 | 2/2010 | Chase et al. |
| 7,689,080 B2 | 3/2010 | Inaba et al. |
| 8,081,853 B2 | 12/2011 | Overton |
| 8,409,479 B2 | 4/2013 | Alexander et al. |
| 8,513,374 B2 | 8/2013 | Dasgupta |
| 8,545,076 B2 | 10/2013 | Bickham et al. |
| 8,591,087 B2 | 11/2013 | Bickham et al. |
| 8,781,278 B2 | 7/2014 | Karayianni |
| 8,811,783 B2 | 8/2014 | Tanaka et al. |
| 8,948,558 B2 | 2/2015 | Chalk et al. |
| 8,957,141 B2 | 2/2015 | Makadia |
| 9,061,920 B2 | 6/2015 | Pohl et al. |
| 9,244,221 B1 | 1/2016 | Ocampo |
| 9,378,868 B2 | 6/2016 | Flenniken et al. |
| 9,529,170 B2 | 12/2016 | Sutehall et al. |
| 9,745,445 B2 | 8/2017 | Zucchelli |
| 2003/0059613 A1 | 3/2003 | Tirelli et al. |
| 2003/0072546 A1 | 4/2003 | Shimada et al. |
| 2003/0133679 A1 | 7/2003 | Murphy et al. |
| 2003/0180017 A1 | 9/2003 | Hayano et al. |
| 2004/0216914 A1 | 11/2004 | Vexler et al. |
| 2005/0004278 A1 | 1/2005 | Knop et al. |
| 2005/0101708 A1 | 5/2005 | Knop et al. |
| 2005/0221568 A1 | 10/2005 | Ishida et al. |
| 2005/0269254 A1 | 12/2005 | Roitman |
| 2006/0088263 A1 | 4/2006 | Tanaka et al. |
| 2006/0127014 A1 | 6/2006 | Ledbetter et al. |
| 2007/0014724 A1 | 1/2007 | Witte et al. |
| 2008/0045623 A1 | 2/2008 | Yamaguchi et al. |
| 2008/0232750 A1 | 9/2008 | Inaba et al. |
| 2009/0118410 A1 | 5/2009 | Herbiet et al. |
| 2009/0281215 A1 | 11/2009 | Kaul |
| 2010/0135623 A1 | 6/2010 | Overton |
| 2010/0290781 A1* | 11/2010 | Overton ............ C03C 13/046 398/43 |
| 2011/0094268 A1 | 4/2011 | Xue et al. |
| 2011/0122646 A1 | 5/2011 | Bickham et al. |
| 2011/0300367 A1 | 12/2011 | Chien |
| 2012/0224818 A1 | 9/2012 | Karayianni |
| 2012/0288246 A1 | 11/2012 | Chalk et al. |
| 2013/0248783 A1 | 9/2013 | Zhu et al. |
| 2013/0330468 A1 | 12/2013 | Makadia |
| 2014/0063838 A1* | 3/2014 | Kouzmina ............ G02B 6/0005 362/558 |
| 2014/0348776 A1 | 11/2014 | Palmer, Jr. et al. |
| 2015/0131952 A1 | 5/2015 | Gallo et al. |
| 2015/0147571 A1 | 5/2015 | Alexander et al. |
| 2015/0203693 A1 | 7/2015 | Mestan |
| 2015/0226928 A1 | 8/2015 | Ceschiat et al. |
| 2017/0002179 A1 | 1/2017 | Henze et al. |
| 2017/0002199 A1 | 1/2017 | Henze et al. |
| 2017/0327665 A1 | 11/2017 | Kaul |

FOREIGN PATENT DOCUMENTS

| | | |
|---|---|---|
| CN | 202996398 U | 6/2013 |
| CN | 203165550 U | 8/2013 |
| CN | 103413606 A | 11/2013 |
| CN | 103435897 A | 12/2013 |
| EP | 0646552 B1 | 12/1997 |
| EP | 1870746 A1 | 12/2007 |
| JP | 7084130 A | 3/1995 |
| JP | 11052184 A | 2/1999 |
| JP | 03174537 B2 | 6/2001 |
| JP | 2001278641 A | 10/2001 |
| JP | 2001305399 A | 10/2001 |
| JP | 2002029784 A | 1/2002 |
| JP | 2003227942 A | 8/2003 |
| JP | 2004018300 A | 1/2004 |
| JP | 2005008448 A | 1/2005 |
| JP | 2005173084 A | 6/2005 |
| JP | 03717475 B2 | 11/2005 |
| JP | 2005326567 A | 11/2005 |
| JP | 03746018 62 | 2/2006 |
| JP | 03955829 B2 | 8/2007 |
| JP | 04195307 B2 | 12/2008 |
| JP | 04495016 B2 | 6/2010 |
| JP | 04532314 B2 | 8/2010 |
| JP | 04776392 B2 | 9/2011 |
| JP | 04956148 B2 | 6/2012 |
| JP | 2013238695 A | 11/2013 |
| JP | 2014058649 A | 4/2014 |
| WO | 2015028047 A1 | 3/2015 |

\* cited by examiner

FLAME-RETARDANT OPTICAL FIBER COATING

CROSS-REFERENCE TO RELATED APPLICATIONS

This application claims the benefit of priority of U.S. Provisional Application Ser. No. 62/260,991 filed on Nov. 30, 2015 and U.S. Provisional Application Ser. No. 62/294,051 filed on Feb. 11, 2016, the contents of which are relied upon and incorporated herein by reference in their entirety.

FIELD

The present disclosure generally relates to optical fiber coating compositions, and more particularly, to flame retardant optical fiber coating compositions.

BACKGROUND

Optical fiber has become accepted as a viable alternative to traditional materials used for data signal communication. Optical fiber is now widely utilized in a variety of electronic devices to facilitate the high-speed communication of data signals at high bandwidths. As the adoption of optical fiber continues to increase, the number of applications where optical fiber must be able to withstand fire also increases. For example, because optical fiber connects multiple locations in a building or other structure, fire and safety regulations often require optical fiber to possess fire-resistant capabilities that prevent the spread of fire. Additionally, it may be beneficial tbr optical fiber to withstand fire without experiencing a significant decrease in transmission performance. For instance, fiber used in fire alarm systems and/or local video surveillance must be able to continue to transmit data in the presence of fire. The functionality of the fiber must be maintained during the fire occurrence and usually also for a predetermined period of time after the fire is extinguished.

SUMMARY

According to an embodiment of the present disclosure, a flame retardant optical fiber is provided. The flame retardant optical fiber includes a glass core, a cladding surrounding the glass core and a primary coating adhered to the cladding. The flame retardant optical fiber also includes a secondary coating surrounding the primary coating, wherein the secondary coating is formed from a coating composition that is substantially free of an oligomeric component and that comprises a flame retardant composition including a flame retardant material.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1:
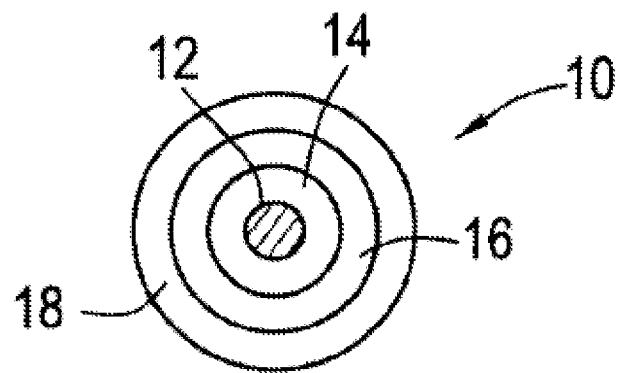
FIG. 1 illustrates a cross section of an optical fiber in accordance with embodiments of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Embodiments of the present disclosure relate to optical fibers having a flame retardant coating material. Optical fibers according to embodiments of the present disclosure include a glass core, a cladding and at least one coating. The at least one coating may include a primary coating and a secondary coating. The primary coating is applied directly to the cladding and, when cured, forms a soft, elastic, and compliant material that encapsulates the glass fiber. The primary coating serves as a buffer to cushion and protect the glass fiber core when the fiber is bent, cabled, or spooled and reduces attenuation of light that results from stresses placed upon the optical fiber during handling. The secondary coating is applied over the primary coating and provides a tough, protective outer layer that prevents damage to the glass fiber during processing and use. According to the present disclosure, the secondary coating is formed from a composition that includes a flame retardant material and is substantially free of an oligomeric component.

As used herein, the term "substantially free of an oligomeric component" means that the coating as prepared and applied to the fiber contains less than about 3.0 wt. % of an oligomeric component used in the starting coating composition. The coating may include, for example, less than about 2.0 wt. % of an oligomeric component, or even less than about 1.0 wt. % of an oligomeric component.

Referring to FIG. 1, an optical fiber in accordance with embodiments of the present disclosure is shown. The optical fiber 10 includes a glass core 12, a cladding layer 4 surrounding and adjacent to the glass core 12, a primary coating material 16 that adheres to the cladding layer 14, and one or more secondary coating materials 18 surrounding and adjacent to the primary coating material 16.

The glass core 12 may include silica glass and may have a cylindrical cross section and a diameter ranging from about 5.0 μm to about 10 μm for single-mode fibers and from about 20 μm to about 100 μm for multi-mode fibers. The glass core 12 may include any conventional material such as those described in U.S. Pat. No. 4,486,212 to Berkey, the specification of which is incorporated herein by reference in its entirety. The glass core 12 can optionally contain varying amounts of other materials such as, for example, oxides of titanium, thallium, germanium, fluorine, and boron, which modify the core's refractive index. Other dopants which are known in the art can also be added to modify its properties of the glass core 12.

According to embodiments of the present disclosure, the cladding layer 14 has a refractive index that is less than the refractive index of the glass core 12. A variety of cladding materials, both plastic and glass (e.g., silicate and borosilicate glasses) may be used in forming the glass portion of the optical fiber 10. Any conventional cladding materials known in the art can be used to form the cladding layer 14.

The glass core 12 and cladding layer 14, which together form the glass portion of the optical fiber 10, may be formed according to a number of processes known in the art. The glass core 12 and cladding layer 14 may have a discernible core-cladding boundary. Alternatively, the core 12 and cladding layer 14 may lack a distinct boundary. One such glass fiber is a step-index fiber, which may be formed by applying the cladding layer 14 as a series of glass or plastic layers of varying refractive index. Exemplary step-index fibers are described in U.S. Pat. Nos. 4,300,930 and 4,402,570, the specifications of which are incorporated by reference in their entirety. Another such fiber is a graded-index fiber, which has a core whose refractive index varies with distance from the fiber. A graded-index fiber may be formed by diffusing the glass core 12 and cladding layer 14 into one another. Exemplary graded-index fibers are described in U.S. Pat. Nos. 5,729,645, 4,439,008, 4,176,911, and 4,076,380, the specifications of which are incorporated by reference in their entirety. The glass portion of the optical fiber 10 may also be single- or multi-moded at the wavelength of interest, e.g., 1310 or 1550 nm. The optical fiber may be adapted for use as a data transmission fiber (e.g. SMF-28®, LEAF®, and METROCOR®, each of which is commercially available from Corning Incorporated of Corning, N.Y.). Alternatively, the optical fiber may perform an amplification, dispersion compensation, or polarization maintenance function. The above discussion is meant to illustrate only a few exemplary embodiments of the present disclosure and is not meant to be limiting. It should be appreciated that optical fibers according to the present disclosure may include these or any other conventional core-cladding layer configurations now known or hereafter developed. The skilled artisan will appreciate that the coatings described herein are suitable for use with virtually any optical fiber for which protection from the environment is desired.

Conventionally, certain characteristics have been desirable for the primary coating. For example, the modulus of the coating must be sufficiently low to cushion and protect the fiber by readily relieving stresses on the fiber. This cushioning effect must be maintained throughout the fiber's lifetime. The Young's modulus of the primary coating may generally be less than about 1.0 MPa, and more preferably, less than about 0.75 MPa. Also, because of differential thermal expansion properties between the primary and secondary coatings, the primary coating may have a glass transition temperature ($T_g$) that is lower than the foreseeable lowest use temperature. This enables the primary coating to remain elastic throughout the temperature range of use, facilitating differences in the coefficient of thermal expansion between the glass fiber and the secondary coating. Further, a low glass transition temperature enables the primary coating to remain soft when the fiber is deployed in a low temperature environment. The glass transition temperature of the primary coating may be, for example, less than about 0° C. Also, the tensile strength of the primary coating, which generally decreases as the modulus decreases, may be high enough to prevent tearing defects during on draw processing or subsequent processing of the coated fiber during cabling, etc. The tensile strength of the primary coating may generally be greater than about 0.3 MPa.

According to embodiments of the present disclosure, the one or more secondary coating materials 18 are the cured product of a coating composition substantially free of an oligomeric component. The coating composition includes a flame retardant composition which includes a flame retardant material dispersed in a combination of two or more radiation curable components. The coating composition may be cured in situ during on-draw processing of the optical fiber. The coating composition may also include a photoinitiator, an antioxidant and other additives described in more detail below.

According to embodiments of the present disclosure, the coating composition may also include a radiation-curable component. The radiation-curable component may include one or more radiation-curable compounds. The radiation-curable compounds may include one or more radiation-curable monomers. The radiation-curable monomer(s) may function as reactive diluent(s) in the coating composition and may afford control over the viscosity of the coating composition to facilitate processing. Each radiation-curable compound includes a radiation-curable functional group. The radiation-curable group may be an ethylenically unsaturated group, such as an acrylate or methacrylate group. The radiation-curable compounds may be monofunctional or multifunctional. Multifunctional radiation-curable compounds may function as crosslinking agents and may be referred to herein as "crosslinkers". Each of the monofunctional or multifunctional radiation-curable compounds may, independently, have a number average molecular weight of less than about 3000 g/mol, or less than about 2500 g/mol, or less than about 2000 g/mol, or less than about 1500 g/mol, or less than about 1000 g/mol.

The radiation-curable component may include a monofunctional or multifunctional monomer. The monomer may include a multifunctional (meth)acrylate monomer. As used herein, the term "(meth)acrylate" means acrylate or methacrylate. The monomer may include polyether (meth)acrylates, polyester (meth)acrylates, or polyol (meth)acrylates. The multifunctional monomer may be a di(meth)acrylate, tri(meth)acrylate, tetra(meth)acrylate, or higher (meth)acrylate. Monofunctional or multifunctional polyol (meth)acrylates may include monofunctional or multifunctional polyalkoxy(meth)acrylates (e.g. polyethyleneglycol diacrylate, polypropylene glycol diacrylate).

Radiation-curable monomers may also include ethylenically-unsaturated compounds, ethoxylated (meth)acrylates, ethoxylated alkylphenol mono(meth)acrylates, propylene oxide (meth)acrylates, n-propylene oxide (meth)acrylates, isopropylene oxide (meth)acrylates, monofunctional (meth)acrylates, monofunctional aliphatic epoxy (meth)acrylates, multifunctional (meth)acrylates, multifunctional aliphatic epoxy (meth)acrylates, and combinations thereof. The monomer component may include compounds having the general formula $R_2—R_1—O—(CH_2CH(CH_3)—O)_n—COCH=CH_2$, where $R_1$ and $R_2$ are aliphatic, aromatic, or a mixture of both, and n=1 to 10, or $R_1—O—(CH_2CH(CH_3)—O)_n—COCH=CH_2$, where $R_1$ is aliphatic or aromatic, and n=1 to 10, or $R_1—O—(CH_2CH(CH_3)—O)_n—COCH=CH_2$, where $R_1$ is aliphatic or aromatic, and n=1 to 10, or formula $R_2—R_1—O—(CH_2CH_2—O)_n—COCH=CH_2$, where $R_1$ and $R_2$ are aliphatic, aromatic, or a mixture of both, and n=1 to 10, or $R_1—O—(CH_2CH_2—O)_n—COCH=CH_2$, where $R_1$ is aliphatic or aromatic, and n=1 to 10.

Representative radiation-curable monomers include ethylenically unsaturated monomers such as ethylhexyl acrylate, lauryl acrylate (e.g.: SR335 commercially available from Sartomer USA of Exton, Pa.; and PHOTOMER® 4812 commercially available from IGM Resins of St. Charles, Ill.), ethyoxylated lauryl acrylate (e.g. CD9075, commercially available from Sartomer USA of Exton, Pa.), ethoxylated nonylphenol acrylate (e.g.: SR504 commercially available from Sartomer USA of Exton, Pa.; and PHOTOMER® 4066 commercially available from IGM Resins of St. Charles, Ill.), caprolactone acrylate (e.g.: SR495 commercially available from Sartomer USA of Exton, Pa.; and TONE M-100 available from Dow Chemical of Midland, Mich.), phenoxyethyl acrylate (e.g.: SR339 commercially available from Sartomer USA of Exton, Pa.; and PHOTOMER® 4035 commercially available from IGM Resins of St. Charles, Ill.), isooctyl acrylate (e.g.: SR440 commercially available from Sartomer USA of Exton, Pa.), tridecyl acrylate (e.g.: SR489 commercially available from Sartomer USA of Exton, Pa.), isobornyl acrylate (e.g.: SR506 commercially available from Sartomer USA of Exton, Pa.), tetrahydrofurfuryl acrylate (e.g.: SR285 commercially available from Sartomer USA of Exton, Pa.), stearyl acrylate (e.g.: SR257 commercially available from Sartomer USA of Exton, Pa.), isodecyl acrylate (e.g.: SR395 commercially available from Sartomer USA of Exton, Pa.), 2-(2-ethoxyethoxy)ethyl acrylate (e.g.: PHOTOMER® 4035 commercially available from IGM Resins of St. Charles, Ill., SR256 commercially available from Sartomer USA of Exton, Pa.), epoxy acrylate (e.g., PHOTOMER® 3016 commercially available from IGM Resins of St. Charles, Ill.; CN120 commercially available from Sartomer USA of Exton, Pa.; and EBECRYL® 3201 and EBECRYL® 3604 both commercially available from Allnex Belgium SA/NV of Brussels, Belgium), lauryloxyglycidyl acrylate (e.g.: CN130 commercially available from Sartomer USA of Exton, Pa.), phenoxyglycidyl acrylate (e.g., CN131 commercially available from Sartomer USA of Exton, Pa.), and ethoxylated bisphenol A diacrylate (SR601, SR602, CD9038 all commercially available from Sartomer USA of Exton, Pa.) and combinations thereof.

The coating composition may include one or more monofunctional radiation-curable monomers in an amount of about 5.0 wt. % to about 95 wt. % of the total coating composition. For example, the coating composition may include one or more monofunctional radiation-curable monomers in an amount of about 10 wt. % to about 85 wt. %, or about 20 wt. % to about 75 wt. % of the total coating composition.

The flame retardant composition may include monofunctional radiation curable components in an amount of between about 20 wt. % to about 70 wt. %. For example, the flame retardant composition may include monofunctional radiation curable components in an amount of between about 25 wt. % to about 50 wt. %, or about 35 wt. % to about 45 wt. % of the total flame retardant composition.

According to embodiments of the present disclosure, the radiation-curable component of the coating composition may include a multifunctional (meth)acrylate. Multifunctional (meth)acrylates are (meth)acrylates having two or more polymerizable (meth)acrylate moieties per molecule. The multifunctional (meth)acrylate may have three or more polymerizable (meth)acrylate moieties per molecule. The multifunctional (meth)acrylate may have four or more polymerizable (meth)acrylate moieties per molecule.

Examples of multifunctional (meth)acrylates include multifunctional (meth)acrylate that may have a number average molecular weight of less than about 700 g/mol, for example, but without limitation, dipentaerythritol monohydroxy pentaacrylate (e.g.: PHOTOMER® 4399 commercially available from IGM Resins of St. Charles, Ill.); methylolpropane polyacrylates with and without alkoxylation such as trimethylolpropane triacrylate (e.g: SR 351 commercially available from Sartomer USA of Exton, Pa.), ditrimethylolpropane tetraacrylate (e.g.: PHOTOMER® 4355 commercially available from IGM Resins of St. Charles, Ill.); alkoxylated glyceryl triacrylates such as propoxylated glyceryl triacrylate with propoxylation being 3 or greater (e.g.: PHOTOMER® 4096 commercially available from IGM Resins of St. Charles, Ill.); triproplyleneglycol diacrylate (e.g: SR306 commercially available from Sartomer USA of Exton, Pa.); dipropylene glycol diacrylate (e.g.: SR508 commercially available from Sartomer USA of Exton, Pa.); and erythritol polyacrylates with and without alkoxylation, such as pentaerythritol tetraacrylate (e.g.: SR295 commercially available from Sartomer USA of Exton, Pa.), ethoxylated pentaerythritol tetraacrylate (e.g.: SR494 commercially available from Sartomer USA of Exton, Pa.), dipentaerythritol pentaacrylate (e.g.: PHOTOMER® 4399 commercially available from IGM Resins of St. Charles, Ill.; and SR399 commercially available from Sartomer USA of Exton, Pa.), and alkoxylated aliphatic polyacrylates, for instance an alkoxylated aliphatic diacrylate such as alkoxylated (e.g. propoxylated) neopentyl glycol diacrylate.

The coating composition may include a monofunctional radiation-curable monomer in an amount of about 20 wt. % of the total coating composition. For example, the coating composition may include a monofunctional radiation-curable monomer in an amount of about 0.05 wt. % to about 20 wt. %, or about 0.1 wt. % to about 15 wt. %, or even about 0.50 wt. % to about 10 wt. % of the total coating composition.

According to embodiments of the present disclosure, the flame retardant material may include at least one inorganic and halogen-free flame retardant filler. As used herein, the term "halogen free" is used to describe an amount of halogen in the flame retardant filler of less than 5.0 wt. %. According to embodiments of the present disclosure, the amount of halogen in the flame retardant filler may be less than about 3.0 wt. %, or even less than about 1.0 wt. %. The flame retardant filler may comply with IEC 61249-2-21 International Electrochemical Commission's (IEC), where halogen-free is defined as a total halogen content of less than 1500 ppm. The flame retardant filler may be for example, but is not limited to, aluminum trihydroxide ($Al(OH)_3$), magnesium hydroxide ($Mg(OH)_2$), hydrated magnesium calcium carbonate (a mixture of Huntite ($Mg_3Ca(CO_3)_4$) and Hydromagnesite ($Mg_5(CO_3)_4(OH)_2.4H_2O$)), zinc borate ($xZnO.yB_2O_3.zH_2O$, where x is 2 or 4, y is between 1 and 6, and z is between 0 and 7), phosphate acrylates (e.g.: MIRAMER SC1400A commercially available from Miwon Specialty Chemical Co. of Anyang, Gyeonggi, South Korea, and Monoacryloxyethyl Phosphate commercially available from Polysciences, Inc. of Warrington, Pa.), phosphate methacrylates (e.g.: Bis[2-(methacryloyloxy)ethyl] phosphate and Ethylene glycol methacrylate phosphate commercially available from Polysciences, Inc. of Warrington, Pa., and MIRAMER SC1400 commercially available from Miwon Specialty Chemical Co. of Anyang, Gyeonggi, South Korea), and mixtures thereof. Such flame retardant fillers are non-toxic. The flame retardant fillers may have a particle size ranging from about 0.01 µm to about 10 µm, for example, between about 0.05 µm to about 7.5 µm, or even between about 0.10 µm to about 5.0 µm .

The flame retardant composition may include flame retardant filler in an amount of greater than about 20 wt. % of the total flame retardant composition. For example, the flame retardant composition may include flame retardant filler in an amount of between about 25 wt. % and about 80 wt. %, or between about 50 wt. % and about 75 wt. %, or even between about 55 wt. % and about 65 wt. % of the total flame retardant composition.

The coating composition may include the flame retardant composition in an amount of between about 30 wt. % and about 95 wt. % of the total coating composition. For example, the coating composition may include the flame retardant composition in an amount of between about 45 wt. % and about 90 wt. %, or about 55 wt. % and about 80 wt. % of the total coating composition.

The coating composition may also include a photoinitiator. The photoinitiator may initiate curing of the coating composition upon exposure to UV radiation. Suitable photoinitiators for the coating composition include 1-hydroxycyclohexylphenyl ketone (e.g.: IRGACURE® 184 commercially available from BASF of Florham Park, N.J.); bis(2, 6-dimethoxybenzoyl)-2,4,4-trimethylpentylphosphine oxide (e.g.: IRGACURE® 1800, IRGACURE® 1850, and IRGACURE® 1700 commercially available from BASF of Florham Park, N.J.); 2,2-dimethoxy-2-phenylacetophenone (e.g., IRGACURE® 651 commercially available from BASF of Florham Park, N.J.); bis(2,4,6-trimethylbenzoyl)-phenylphosphine oxide (IRGACURE® 819 commercially available from BASF of Florham Park, N.J.); (2,4,6-trimethylbenzoyl)diphenyl phosphine oxide (LUCIRIN® TPO commercially available from BASF of Florham Park, N.J.); ethoxy(2,4,6-trimethylbenzoyl)-phenylphosphine oxide (LUCIRIN® TPO-L commercially available from BASF of Florham Park, N.J.); and combinations thereof. The photoinitiator may be present in an amount from about 0.50 wt. % to about 5.0 wt. %, or from about 1.0 wt. % to about 3.0 wt. %.

The coating composition may also include other additives such as an adhesion promoter, a strength additive, a reactive diluent, an antioxidant (eg.: IRGANOX® 1035 commercially available from BASF of Florham Park, N.J.), a catalyst, a stabilizer, an optical brightener, a property-enhancing additive, an amine synergist, a wax, a lubricant, and/or a slip agent (eg.: a silicone resin such DC57 and DC190 commercially available from Dow Corning of Midland, Mich.). Some additives may operate to control the polymerization process, thereby affecting the physical properties (e.g., modulus, glass transition temperature) of the cured coating materials 18 formed from the coating composition. Other additives may affect the integrity of the cured coating materials 18 formed from the coating composition (e.g., protect against de-polymerization or oxidative degradation).

Embodiments of the present disclosure provide flame retardant coating compositions that are non-toxic and that provide improved flame retardant performance. According to embodiments of the present disclosure, the coating compositions described herein may have a Limiting Oxygen Index (LOI) of greater than about 30%. For example, the LOI of coating compositions described herein may be greater than about 32% or even greater than about 34%. According to embodiments of the present disclosure, the coating compositions described herein may exhibit a time to ignition (TTI) of greater than about 45 seconds. For example, the coating compositions described herein may exhibit a TTI of greater than about 50 seconds, greater than about 55 seconds, or even greater than about 60 seconds. According to embodiments of the present disclosure, the coating compositions described herein may exhibit peak of heat release rate (PHRR) of less than about 1200 $kW/m^2$. For example, the coating compositions described herein may exhibit a PHRR of less than about 1000 $kW/m^2$, less than about 800 $kW/m^2$, or even less than about 600 $kW/m^2$. According to embodiments of the present disclosure, the coating compositions described herein may exhibit total heat release (THR) of less than about 80 $MJ/m^2$. For example, the coating compositions described herein may exhibit a THR of less than about 60 $MJ/m^2$, or less than about 55 $MJ/m^2$, or even less than about 50 $MJ/m^2$. According to embodiments of the present disclosure, the coating compositions described herein may have a flame propagation index (PHRR/TTI) of less than about 32 $kW/m^2s$. For example, the coating compositions described herein may exhibit a flame propagation index of less than about 28 $kW/m^2s$, or less than about 25 $kW/m^2s$, or even less than about 20 $kW/m^2$.

EXAMPLES

The constituents of flame retardant coating compositions formed in accordance with embodiments disclosed herein are listed in Table I. Each composition is identified by a separate reference numeral. The weight percent of constituents of a bulk composition is shown in Table I such that the total weight percent of these constituents equals 100 wt. %. To this bulk composition, an amount of other additives, such as an adhesion promoter, may be added. These other additives are shown in Table I in parts per hundred (pph). Except where phosphates are included in the flame retardant material(s), the coating compositions were formed by incorporating flame retardant material(s) dispersed in at least one radiation curable monomer into coating compositions. In contrast, phosphates may be incorporated into the coating compositions without being dispersed in a monomer. In Table I: A1 is 70% hydrated magnesium calcium carbonate dispersed in propoxylated neopentyl glycol diacrylate ((PO)NPGDA); A2 is 65% aluminum trihydroxide dispersed in (PO)NPGDA; A3 is 60% hydrated magnesium calcium carbonate dispersed in (PO)NPGDA; A4 is 65% aluminum trihydroxide having a median particle size of 1.1 µm dispersed in (PO)NPGDA; A5 is 70% zinc borate dispersed in (PO)NPGDA and bisphenol diacrylate monomer (SR602);

A6 is 65% aluminum trihydroxide having a diameter of 0.25 μm dispersed in (PO)NPGDA; A7 is 65% magnesium hydroxide dispersed in (PO)NPGDA; and A8 is a phosphate acrylate (MIRAMER SC1400A). Also in Table I: B1 is ethoxylated (4) bisphenol A monomer (SR601); B2 is an epoxy diacrylate monomer (PHOTOMER® 3016); and B3 is ethoxylated bisphenol A diacrylate (CD9038). In Table I, C2 is a photoinitiator (IRGACURE® 184) and C3 is a photoinitiator (LUCIRIN® TPO). Finally in Table I, D1 is an antioxidant (IRGANOX® 1035); and D2 is a silicone resin (DC190).

TABLE I

Coating Compositions

| | Coating Compositions Reference Numbers | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| A1 (wt. %) | 50 | 71 | 83 | 93 | 83 | | | | | | | | |
| A2 (wt. %) | | | | | | 76 | | | | | | | |
| A3 (wt. %) | | | | | | | | 90 | | | | | |
| A4 (wt. %) | | | | | | | 76 | | 69 | | | | |
| A5 (wt. %) | | | | | | | | | 7 | | 7 | 4 | |
| A6 (wt. %) | | | | | | | | | | 76 | | | 38 |
| A7 (wt. %) | | | | | | | | | | | 75 | 38 | |
| A8 (wt. %) | | | | | | | 30 | | | | | | |
| B1 (wt. %) | 48 | 27 | 15 | | 13 | 22 | 47 | 8 | 18 | 18 | 18 | 12 | 14 |
| B2 (wt. %) | | | | 5 | 2 | | 20 | | | | | | |
| C1 (wt. %) | | | | | | | | | 4 | 4 | 4 | 4 | 4 |
| C2 (wt. %) | 1 | 1 | 1 | 1 | 1 | 1 | 1.5 | 1 | 1 | 1 | 1 | 1 | 1 |
| C3 (wt. %) | 1 | 1 | 1 | 1 | 1 | 1 | 1.5 | 1 | 1 | 1 | 1 | 1 | 1 |
| D1 (pph) | 0.4 | 0.4 | 0.4 | 0.4 | 0.4 | 0.4 | 0.5 | 0.4 | 0.4 | 0.4 | 0.4 | 0.4 | 0.4 |
| D2 (pph) | | | | | | | 1 | | | | | | |

Compositions were used to make rod samples for tensile testing. The coating rods were prepared by injecting the coating compositions into Teflon® tubing having an inner diameter of about 0.025 in. The coating filled Teflon® tubing was exposed to UV irradiation from a Fusion D bulb at a dose of about 2.4 J/cm² (measured over a wavelength range of 225-424 nm by a Light Bug model IL390 from International Light). The Teflon® tubing was then stripped away. The formed rods were allowed to condition overnight at 23° C. and 50% relative humidity for about 18-24 hours before tensile testing. Tensile properties were measured using a Sintech MTS tensile tester. Tensile tests followed ASTM882-97. The gauge length used for testing was 5.1 cm and the test speed was 2.5 cm/minute. Tensile strength, % elongation at break, and Young's Modulus of the cured films are summarized in Table II below, respectively, for the coating compositions listed in Table I. The films are labeled by the reference numerals of the coating compositions from which they were prepared. The reference numerals in Table II correspond with those listed in Table I.

TABLE II

Properties of Cured Films

| Ref. No. | Tensile Strength (MPa) | Elongation (%) | Young's Modulus (MPa) |
|---|---|---|---|
| 1 | 37.2 ± 2.30 | 25.8 ± 7.3 | 1973 ± 120 |
| 2 | 29.9 ± 0.50 | 16.9 ± 3.8 | 1894 ± 164 |
| 3 | 24.4 ± 0.50 | 12.9 ± 3.1 | 1222 ± 98 |
| 4 | 21.8 ± 0.40 | 9.4 ± 0.6 | 669 ± 51 |
| 5 | 25.0 ± 0.50 | 12.1 ± 1.5 | 1483 ± 128 |
| 6 | 29.7 ± 0.30 | 7.5 ± 0.5 | 1407 ± 78 |
| 7 | 52.8 ± 9.50 | 44.1 ± 8.6 | 1341 ± 51 |
| 8 | 24.0 ± 0.70 | 22.2 ± 8.4 | 1497.3 ± 120.3 |

TABLE II-continued

Properties of Cured Films

| Ref. No. | Tensile Strength (MPa) | Elongation (%) | Young's Modulus (MPa) |
|---|---|---|---|
| 9 | 24.3 ± 0.70 | 14.0 ± 5.0 | 1603.6 ± 133.3 |
| 10 | 34.3 ± 0.60 | 16.6 ± 1.7 | 1780.5 ± 111.1 |
| 11 | 29.8 ± 0.70 | 13.5 ± 2.2 | 1306.7 ± 89.8 |
| 12 | 35.8 ± 0.90 | 12.6 ± 1.3 | 1635.5 ± 131.4 |
| 13 | 24.3 ± 0.70 | 22.2 ± 8.4 | 1497.3 ± 120.3 |

Figure 2:
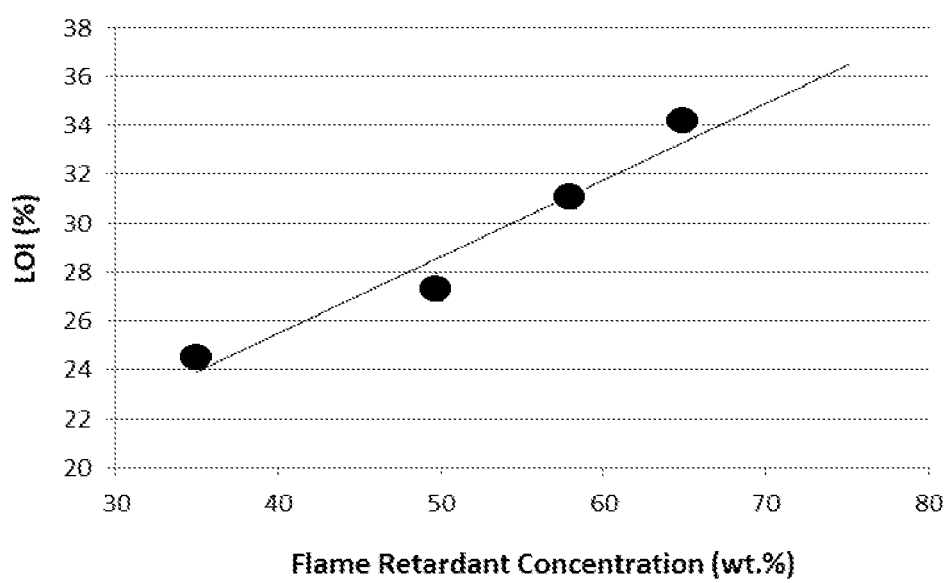
FIG. 2 is a graph showing the Limiting Oxygen Index (LOI) of coating compositions in accordance with embodiments of the present disclosure.

The effect of flame retardant filler on Limiting Oxygen Index (LOI) was examined. Coating compositions having different concentrations of hydrated magnesium calcium carbonate were formed and an LOI, as measured by ASTM D-2863, was measured to determine the minimal oxygen concentration required to support combustion. Generally, high LOT values are desirable because they are indicative of materials that are less susceptible to burning. FIG. 2 is a graph showing the LOI of coating compositions having 35%, 50%, 60% and 65% flame retardant filler. As shown, the LOI increases from about 24% for the coating composition having 35% flame retardant filler to about 34% for the coating composition having 65% flame retardant filler.

Flammability and fire behavior properties of samples of the flame retardant coating materials were tested under forced flame conditions using the cone calorimeter method in accordance with ISO 5660. As a comparison, two samples formed from commercially available non-flame retardant coating materials were also tested using the cone calorimeter method. Cone calorimeter samples were prepared by filling a square mold with coating compositions and cured with UV irradiation. Cured coating sheets were then removed from the mold and tested. The samples were square specimens having dimensions of 100 mm×100 mm×3.0 mm. The samples were allowed to condition to equilibrium at 23° C. and 50% relative humidity. The specimens were placed on an aluminum tray which was placed on a refractory fiber blanket on top of a ceramic board, and the surface of the specimens were horizontally exposed to irradiation from a cone heater at a heat flux of 50 kW/m². FIGS. 2A-2D illustrate the cone calorimeter testing results.

Figure 3A:
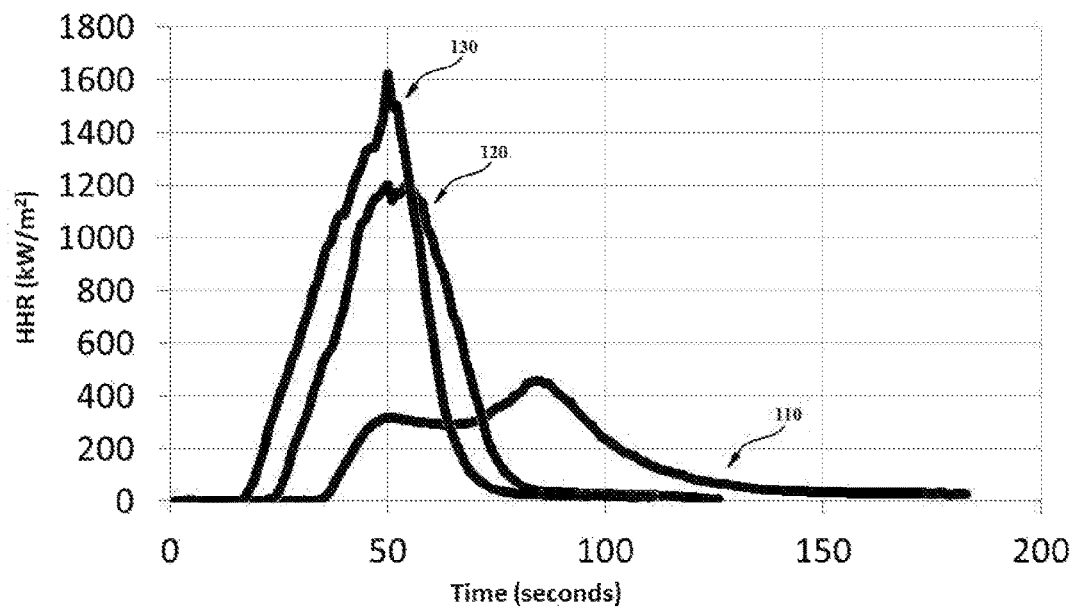
FIG. 3A is a graph showing the heat release rate (HRR) over time for a flame retardant coating sample and two non-flame retardant coating samples.

FIG. 3A is a graph showing the heat release rate (HRR) over time for the flame retardant coating sample 110 formed from coating composition A6 shown in Table I, and the two commercially available non-flame retardant coating samples 120 and 130. As shown, the flame retardant coating sample exhibited a longer burning path than the non-flame retardant coating samples. The flame retardant coating sample had a peak heat release rate of about 425 kWm$^{-2}$ while the non-flame retardant coating samples had a peak heat release rate of between about 1200-1600 kWm$^{-2}$. FIG. 3A shows two peaks for the flame retardant coating sample (a first peak at about 50 seconds and a second peak at about 80 seconds). The first peak, which corresponds to the time period at which the non-flame retardant coating samples exhibited peak heat release rate, is believed to show the effect of the flame retardant filler material in reducing the peak heat release rate. The first peak corresponds to anaerobic combustion of the coating sample. At about 80 seconds, where the second peak is observed, the flame retardant coating sample was observed to char. While this charring aided in maintaining a lower heat release rate than exhibited by the non-flame retardant coating materials, it also effectively extends the combustion time of the flame retardant coating sample. The second peak corresponds to the burning of the char structure under aerobic oxidative conditions.

Figure 3B:
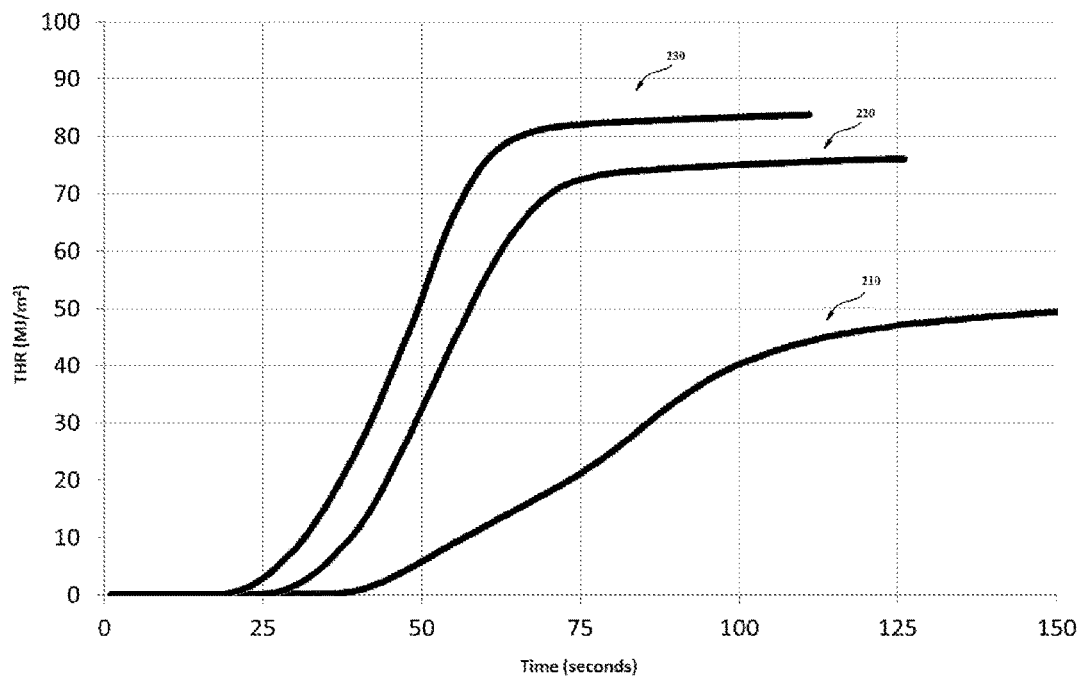
FIG. 3B is a graph showing the total heat rate (THR) over time for a flame retardant coating sample and two non-flame retardant coating samples.

FIG. 3B is a graph showing the total heat rate (THR) over time for the flame retardant coating sample 210 and the two non-flame retardant coating samples 220 and 230. As shown, the flame retardant coating sample exhibited a lower total heat rate than the non-flame retardant coating materials. The flame retardant coating sample showed a more gradual increase of total heat rate over time and plateaued at a lower total heat rate.

Figure 3C:
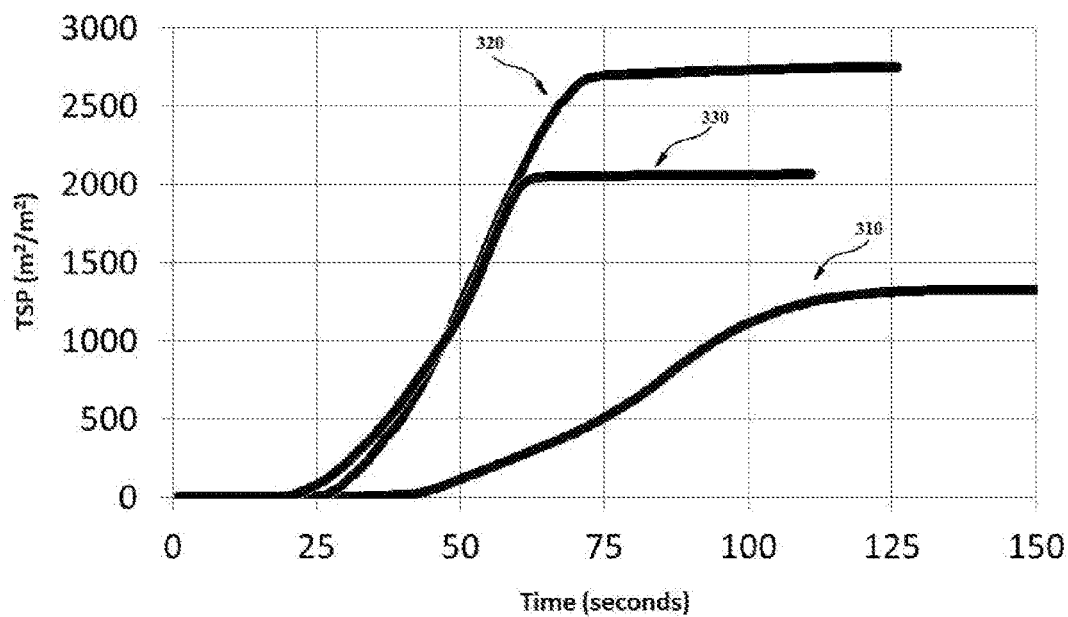
FIG. 3C is a graph showing total smoke production (TSP) over time for a flame retardant coating sample and two non-flame retardant coating samples.

FIG. 3C is a graph showing total smoke production (TSP) over time for the flame retardant coating sample 310 and the two non-flame retardant coating samples 320 and 330. As shown, the flame retardant coating sample exhibited a lower total smoke production than the non-flame retardant coating materials. The flame retardant coating sample showed a more gradual increase of total smoke production over time and plateaued at a lower smoke production.

Figure 3D:
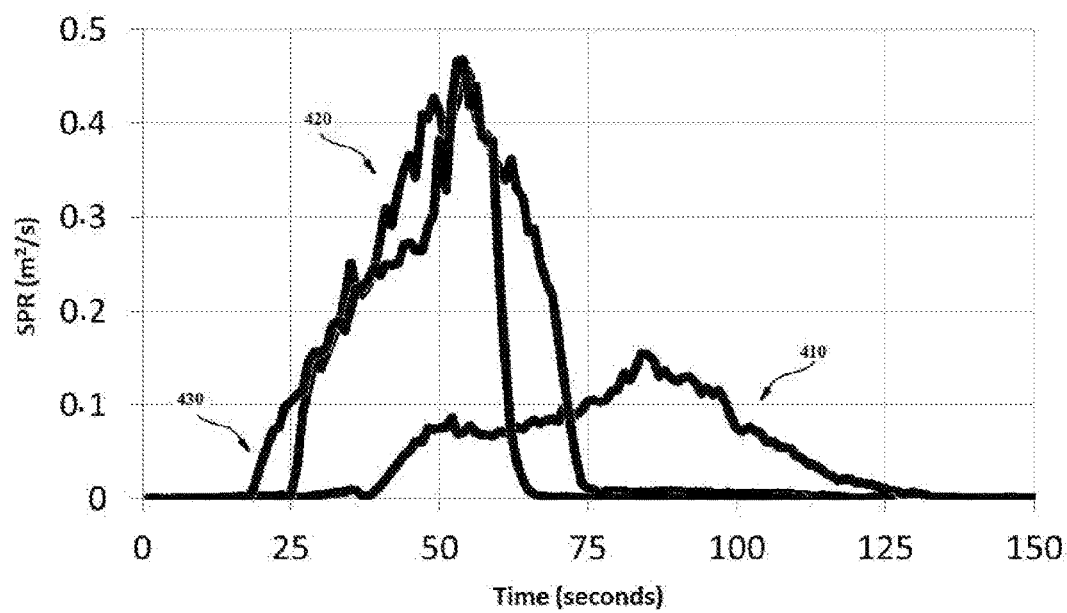
FIG. 3D is a graph showing smoke production rate (SPR) over time for a flame retardant coating sample and two non-flame retardant coating samples.

FIG. 3D is a graph showing smoke production rate (SPR) over time for the flame retardant coating sample 410 and the two non-flame retardant coating samples 420 and 430. As shown, the flame retardant coating sample exhibited a lower smoke production rate than the non-flame retardant coating materials. The flame retardant coating sample showed a more gradual increase of smoke production rate over time.

Flammability and fire behavior properties of several of the coating compositions of Table I were tested under forced flame conditions using the cone calorimeter method in accordance with ISO 5660. As a comparison, samples of a non-flame retardant coating material were also tested under forced flame conditions.

The results are shown in FIGS. 4A-4D and summarized in Table III where TTI is Time to Ignition, PHRR is the Peak of Heat Release Rate, THR is Total Heat Release and PHRR/TTI is the Flame Propagation Index. As compared to the non-flame retardant coating material, the coating compositions tested showed decreases in PHRR, THR and PHRR/TTI. Many of the coating compositions also exhibited an increase in TTI as compared to the non-flame retardant coating materials.

TABLE III

Properties of Cured Films

| Ref. No. | TTI (seconds) | PHRR (kW/m$^2$) | THR (MJ) | PHRR/TTI (kW/m$^2$s) |
|---|---|---|---|---|
| 5 | 31 | 353 | 51 | 11.4 |
| 6 | 66 | 494 | 51 | 7.5 |
| 7 | 28 | 740.5 | 42 | 26.9 |
| 9 | 65 | 418 | 48 | 6.4 |
| 10 | 51 | 367 | 45 | 7.2 |
| 11 | 53 | 373 | 43 | 7.0 |
| 12 | 44 | 613 | 56 | 13.9 |
| 13 | 53 | 516 | 51 | 9.7 |
| Non-Flame Retardant | 44 | 1293 | 80 | 29.4 |

To further illustrate embodiments of the present disclosure, two otherwise identical 72-fiber loose tube cables were manufactured where the individual optical fibers in the first cable were formed from coating composition A6 shown in Table I in accordance with the present disclosure, and the second cable was formed with non-flame retardant coating compositions. Optical fibers were drawn having a glass diameter of about 125 μm, an outer diameter of the primary coating of about 190 μm and the outer diameter of the secondary coating was about 242 μm. The loose tube cables had an outer diameter of about 9.2 mm and included six buffer tube units including twelve optical fibers per buffer tube unit. The fiber optic cables were tested according to EN 50399: 2011 "Common test methods for cables under fire conditions-Heat release and smoke production measurements on cable during flame spread test-test apparatus, procedures and results", the content of which is incorporated herein by reference in its entirety. Sixteen samples of each of the optical fiber cables having a length of 3.5 m were vertically fixed on a metal ladder with a gap of 9.2 mm between each sample. The samples were then exposed for 20 minutes to a flame from a burner having an output set at about 20.5 kW.

Several parameters of the flammability of the fiber optic cables were measured and are reported in Table IV. Flame spread (FS) is the measure of the distance the flame spread during the period of time the samples were exposed to the flame. As shown in Table IV, the cable including optical fibers having coating compositions in accordance with the present disclosure exhibited a significantly reduced fire spread as compared to the cable including optical fibers having non-flame retardant coating compositions. The cable including optical fibers having coating compositions in accordance with the present disclosure also exhibited significant reductions in Total Heat Release (THR) and Peak of Heat Release Rate (PHRR), Fire Growth Rate (FIGRA: which is the growth rate of the burning intensity during the test) and Total Smoke Production (TSP) as compared to the cable including optical fibers having non-flame retardant coating compositions. In general, international flame retardant standards classify cables in accordance with EN 50399, where Class A is for non-combustible products; Class B1 is the best class of the combustible products; Classes B2 and C are for products capable of some degree of fire spreading; and Class D is for products that have fire characteristics similar to that of ordinary wood. As shown in Table IV, the cable including optical fibers having flame retardant coating compositions in accordance with the present disclosure was classified as Class C, whereas to the cable including optical fibers having non-flame retardant coating compositions was classified as Class D.

TABLE IV

| | FS (m) | THR (MJ) | PHRR (kW) | FIGRA (W/s) | TSP (m$^2$) | CLASS |
|---|---|---|---|---|---|---|
| Non-Flame Retardant | 2.75 | 25.6 | 44.4 | 120 | 60 | D |
| Flame Retardant | 1.73 | 11.3 | 27.6 | 81.3 | 28 | C |

It will be apparent to those skilled in the art that various modifications and variations can be made without departing from the spirit or scope of the present disclosure.

What is claimed is:

1. A flame retardant optical fiber comprising:
   a glass core;
   a glass cladding surrounding the glass core;
   a primary coating adhered to the cladding, the primary coating having a glass transition temperature of less than about 0° C.; and
   a secondary coating surrounding the primary coating, wherein the secondary coating is formed from a coating composition that is substantially free of an oligomeric component and that comprises a flame retardant composition comprising a flame retardant material,
   wherein the flame retardant material comprises at least one inorganic and halogen-free flame retardant filler, and
   wherein the at least one inorganic and halogen-free flame retardant filler is selected from the group consisting of hydrated magnesium calcium carbonate, zinc borate, phosphates and mixtures thereof.

2. The flame retardant optical fiber of claim 1, wherein the at least one inorganic and halogen-free flame retardant filler has a particle size ranging from about 0.01 µm to about 10 µm.

3. The flame retardant optical fiber of claim 1, wherein the flame retardant composition comprises the flame retardant material in an amount of greater than about 20 wt. %.

4. The flame retardant optical fiber of claim 1, wherein the flame retardant composition comprises the flame retardant material in an amount of between about 25 wt. % and about 80 wt. %.

5. The flame retardant optical fiber of claim 1, wherein the coating composition of the secondary coating comprises flame retardant composition in an amount of between about 30 wt. % and about 95 wt. %.

6. The flame retardant optical fiber of claim 1, wherein the coating composition of the secondary coating comprises the flame retardant composition in an amount of between about 45 wt. % and about 90 wt. %.

7. The flame retardant optical fiber of claim 1, wherein the flame retardant composition comprises two or more radiation curable components in an amount of between about 5.0 wt. % to about 95 wt. %.

8. The flame retardant optical fiber of claim 1, wherein the flame retardant composition comprises two or more radiation curable components in an amount of between about 10 wt. % to about 85 wt. %.

9. The flame retardant optical fiber of claim 1, wherein the coating composition of the secondary coating comprises a radiation-curable component.

10. The flame retardant optical fiber of claim 1, wherein the coating composition of the secondary coating comprises a radiation curable component, and wherein the flame retardant composition comprises two or more radiation curable components in an amount of between about 5.0 wt. % to about 95 wt. %.

11. The flame retardant optical fiber of claim 1, wherein the coating composition of the secondary coating further comprises a photoinitiator.

12. The flame retardant optical fiber of claim 11, wherein the coating composition of the secondary coating comprises the photoinitiator in an amount of between about 0.50 wt. % to about 5.0 wt. %.

13. The flame retardant optical fiber of claim 1 comprising a Limiting Oxygen Index (LOI) of greater than about 30%.

14. The flame retardant optical fiber of claim 1 comprising a Limiting Oxygen Index (LOI) of greater than about 32%.

15. The flame retardant optical fiber of claim 1 comprising a Limiting Oxygen Index (LOI) of greater than about 34%.

16. The flame retardant optical fiber of claim 1 comprising a time to ignition (TTI) of greater than about 45 seconds.

17. The flame retardant optical fiber of claim 1 comprising a time to ignition (TTI) of greater than about 50 seconds.

18. The flame retardant optical fiber of claim 1 comprising a peak of heat release rate (PHRR) of less than about 1200 kW/m$^2$.

19. The flame retardant optical fiber of claim 1 comprising a peak of heat release rate (PHRR) of less than about 1000 kW/m$^2$.

20. The flame retardant optical fiber of claim 1 comprising a total heat release (THR) of less than about 80 MJ/m$^2$.

21. The flame retardant optical fiber of claim 1 comprising a total heat release (THR) of less than about 60 MJ/m$^2$.

22. The flame retardant optical fiber of claim 1 comprising a flame propagation index of less than about 32 kW/m$^2$s.

23. The flame retardant optical fiber of claim 1 comprising a flame propagation index of less than about 28 kW/m$^2$s.

* * * * *